United States Patent
Högasten et al.

(10) Patent No.: US 9,237,284 B2
(45) Date of Patent: Jan. 12, 2016

(54) SYSTEMS AND METHODS FOR PROCESSING INFRARED IMAGES

(71) Applicant: FLIR Systems, Inc., Wilsonville, CA (US)

(72) Inventors: Nicholas Högasten, Santa Barbara, CA (US); Malin Ingerhed, Linköping (SE)

(73) Assignee: FLIR Systems, Inc., Wilsonville, OR (US)

( * ) Notice: Subject to any disclaimer, the term of this patent is extended or adjusted under 35 U.S.C. 154(b) by 142 days.

(21) Appl. No.: 13/622,178

(22) Filed: Sep. 18, 2012

(65) Prior Publication Data
US 2013/0022279 A1 Jan. 24, 2013

Related U.S. Application Data

(63) Continuation-in-part of application No. 13/529,772, filed on Jun. 21, 2012, now Pat. No. 8,780,208, which is a continuation of application No. 12/396,340, filed on Mar. 2, 2009, now Pat. No. 8,208,026.

(51) Int. Cl.
*H04N 5/365* (2011.01)
*H04N 5/33* (2006.01)

(52) U.S. Cl.
CPC ............... *H04N 5/3658* (2013.01); *H04N 5/33* (2013.01)

(58) Field of Classification Search
None
See application file for complete search history.

(56) References Cited

U.S. PATENT DOCUMENTS

| | | | |
|---|---|---|---|
| 5,258,621 A | 11/1993 | Noble | |
| 5,654,549 A | 8/1997 | Landecker et al. | |
| 5,881,182 A | 3/1999 | Fiete et al. | |
| 5,903,659 A | 5/1999 | Kilgore | |
| 7,566,942 B2 | 7/2009 | Viens et al. | |

(Continued)

FOREIGN PATENT DOCUMENTS

CN 1917590 2/2007
JP 2002344814 A * 11/2002

OTHER PUBLICATIONS

Perry, Greg. "Counters and Accumulators." Absolute Beginner's Guide to Programming. Second Edition. Que, 2001. Safari Books Online Web. May 19, 2014.*

(Continued)

*Primary Examiner* — Chan Park
*Assistant Examiner* — Geoffrey E Summers
(74) *Attorney, Agent, or Firm* — Haynes and Boone, LLP

(57) ABSTRACT

Various techniques are provided to process infrared images. In one implementation, a method of processing infrared image data includes receiving infrared image data associated with a scene. The infrared image data comprises a plurality of pixels arranged in a plurality of rows and columns. The method also includes selecting one of the columns. The method also includes, for each pixel of the selected column, comparing the pixel to a corresponding plurality of neighborhood pixels. The method also includes, for each comparison, adjusting a first counter if the pixel of the selected column has a value greater than the compared neighborhood pixel. The method also includes, for each comparison, adjusting a second counter if the pixel of the selected column has a value less than the compared neighborhood pixel. The method also includes selectively updating a column correction term associated with the selected column based on the first and second counters.

18 Claims, 13 Drawing Sheets

(56) References Cited

U.S. PATENT DOCUMENTS

| | | |
|---|---|---|
| 8,203,116 B2 | 6/2012 | Young |
| 8,208,026 B2 | 6/2012 | Högasten et al. |
| 2003/0198400 A1 | 10/2003 | Alderson et al. |
| 2006/0262210 A1 | 11/2006 | Smith et al. |
| 2006/0279632 A1 | 12/2006 | Anderson |
| 2007/0216786 A1* | 9/2007 | Hung et al. .................. 348/246 |
| 2009/0141124 A1* | 6/2009 | Liu et al. ........................ 348/65 |
| 2009/0257679 A1 | 10/2009 | Hogasten |
| 2010/0165122 A1 | 7/2010 | Castorina et al. |
| 2010/0220193 A1* | 9/2010 | Hogasten et al. ............ 348/164 |
| 2010/0329583 A1 | 12/2010 | Whiteside et al. |
| 2012/0091340 A1 | 4/2012 | Young |

OTHER PUBLICATIONS

Neto et al., "Figures of merit and optimization of a $VO_2$ microbolometer with strong electrothermal feedback", SPIE, Jul. 1, 2008, pp. 1-15, vol. 47, No. 7, Bellingham, WA.

Tzimopoulou et al., "Scene based techniques for nonuniformity correction of infrared focal plane arrays", Proceedings of SPIE, Jul. 19, 1998, pp. 172-183, vol. 3436, international Society for Optical Engineering, US.

* cited by examiner

SYSTEMS AND METHODS FOR PROCESSING INFRARED IMAGES

CROSS-REFERENCE TO RELATED APPLICATIONS

This application is a continuation-in-part application of U.S. patent application Ser. No. 13/529,772 entitled "SYSTEMS AND METHODS FOR PROCESSING INFRARED IMAGES" filed Jun. 21, 2012, which is a continuation application of U.S. patent application Ser. No. 12/396,340 entitled "SYSTEMS AND METHODS FOR PROCESSING INFRARED IMAGES" filed Mar. 2, 2009, all of which are incorporated herein by reference in their entirety.

TECHNICAL FIELD

The present invention relates generally to infrared imaging and, more particularly, to image processing of infrared images, such as with noise filtering techniques.

BACKGROUND

An image generated by an infrared imager, such as, for example, a microbolometer-based infrared imager, typically includes noise. For example, the dominant source of noise may be due to temporal, 1/f, and/or fixed spatial noise, and a typical infrared imaging system may include calibration algorithms to try to minimize these types of noise.

As an example, an infrared imaging system generally uses an internal shutter that lets the infrared imaging system acquire an image against a uniform target to perform calibration procedures. However, there are some drawbacks associated with this type of procedure. For example, the requirement of a shutter increases manufacturing costs of the infrared imaging system. In addition, the calibration procedure does not correct for noise sources beyond the shutter (e.g., due to a lens or other components within the optical path). Also, the scene temperature may be different from that of the shutter and the detector elements response to irradiation may not be completely linear. As such, a correction made at the shutter temperature may not be appropriate for the particular scene that the infrared imaging system is imaging. Moreover, during offset calibration using the shutter, the infrared imaging system may not be available to capture images of a scene, as desired by a user.

Human observers are particularly sensitive to high frequency spatial noise that is typical of infrared imagers. Low pass filters can be used to reduce noise but this blurs the image and lowers the system performance.

As a result, there is a need for improved techniques directed to infrared imaging and processing of infrared images that may reduce spatial, temporal, and/or 1/f type noise without relying on a shutter or requiring a uniform scene and that may introduce no or minimal blur.

SUMMARY

Systems and methods disclosed herein, in accordance with one or more embodiments, provide techniques for processing images captured by infrared sensors (e.g., infrared cameras), such as to improve image quality. For example, in accordance with an embodiment, image processing algorithms are disclosed to separate an infrared image into column and row parts or portions, which may be separately processed to reduce noise and provide an improved infrared image.

In accordance with one or more embodiments, systems and methods for processing infrared image data comprises receiving infrared image data from a non-uniform scene, separating the infrared image data into a column noise filter portion and a row noise filter portion, determining column noise offset terms, applying column noise filter correction to the infrared image data based on the column noise offset terms, determining row noise offset terms, applying row noise filter correction to the infrared image data based on the row noise offset terms, providing corrected infrared image data based on the column and row noise filter correction as infrared output image data, and storing the infrared output image data. In one implementation, an identical column noise offset term is applied to each corresponding pixel in a specific column in the column noise filter portion, and an identical row noise offset term is applied to each corresponding pixel in a specific row in the row noise filter portion.

In various implementations, the systems and methods may comprise separately calculating column neighbor differences of the row noise filter portion by calculating, for each pixel, a difference between a center pixel and a plurality of neighboring pixels, and separately calculating row neighbor differences of the column noise filter portion by calculating, for each pixel, a difference between a center pixel and a plurality of neighboring pixels. The systems and methods may comprise separately performing a histogram of the column and row neighbor differences after separately calculating column and row neighbor differences, separately comparing the column and row neighbor differences to a predetermined threshold, and adding the column and row neighbor differences to respective columns and rows, if the difference is below the predetermined threshold. In one aspect, adding the column and row neighbor differences for respective columns and rows comprises adding the column and row neighbor differences to the histogram for specific columns and rows, respectively.

In various implementations, the systems and methods may comprise determining a median difference for respective columns and rows, adding the median difference to one or more previous correction terms for respective columns and rows, and applying the correction terms to the infrared image data. In one aspect, the infrared image data comprises infrared input video data, the corrected infrared image data comprises corrected infrared video data, and the infrared output image data comprises infrared output video data. The systems and methods may comprise high pass filtering the infrared image data prior to estimating the column and row noise filter correction values. In one aspect, high pass filtering respective rows and columns comprises subtracting a result of a low pass filter operation. The infrared image data may comprise a plurality of frames, wherein each frame is separately corrected as a current frame having at least one previous frame except for a first frame. The systems and methods may comprise delaying the infrared image data by one frame and displaying the infrared output image data.

In accordance with an embodiment, a method for processing infrared image data comprises receiving infrared image data from a multi-pixel infrared detector based on a non-uniform scene, identifying a column noise filter portion of the infrared image data, determining column noise offset terms for corresponding columns, applying column noise filter correction to the infrared image data based on the column noise offset terms, wherein the column noise offset term is applied to at least a majority of the infrared image data in each corresponding column in the column noise filter portion, providing corrected infrared image data based on the column noise filter correction as infrared output image data, and storing the infrared output image data.

In accordance with an embodiment, an infrared imaging system comprises an infrared detector (e.g., as used by an infrared imaging device, such as an infrared camera), a processor adapted to process infrared image data from the infrared detector of a non-uniform scene, and a storage component adapted to store the infrared output image data. The processor may be adapted to process infrared image data from the infrared detector by receiving infrared image data from a multi-pixel infrared detector based on a non-uniform scene, identifying a column noise filter portion of the infrared image data, determining column noise offset terms for corresponding columns, applying column noise filter correction to the infrared image data based on the column noise offset terms, wherein the column noise offset term is applied to at least a majority of the infrared image data in each corresponding column in the column noise filter portion, and providing corrected infrared image data based on the column noise filter correction as infrared output image data.

In accordance with an embodiment, a method of processing infrared image data includes receiving infrared image data associated with a scene, wherein the infrared image data comprises a plurality of pixels arranged in a plurality of rows and columns; selecting one of the columns; for each pixel of the selected column, comparing the pixel to a corresponding plurality of neighborhood pixels; for each comparison, adjusting a first counter if the pixel of the selected column has a value greater than the compared neighborhood pixel; for each comparison, adjusting a second counter if the pixel of the selected column has a value less than the compared neighborhood pixel; and selectively updating a column correction term associated with the selected column based on the first and second counters.

In accordance with an embodiment, a system includes a memory component adapted to receive infrared image data associated with a scene, wherein the infrared image data comprises a plurality of pixels arranged in a plurality of rows and columns; and a processor adapted to execute instructions to: select one of the columns, for each pixel of the selected column, compare the pixel to a corresponding plurality of neighborhood pixels, for each comparison, adjust a first counter if the pixel of the selected column has a value greater than the compared neighborhood pixel, for each comparison, adjust a second counter if the pixel of the selected column has a value less than the compared neighborhood pixel, and selectively update a column correction term associated with the selected column based on the first and second counters.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems and methods disclosed herein, in accordance with one or more embodiments, provide image processing algorithms for images captured by infrared imaging systems. For example, in one embodiment, the infrared images may be processed to reduce noise within the infrared images (e.g., improve image detail and/or image quality). For one or more embodiments, processing techniques may be applied to reduce noise within a row and/or a column of the infrared image.

A significant portion of noise may be defined as row and column noise. This type of noise may be explained by non-linearities in a Read Out Integrated Circuit (ROIC). This type of noise, if not eliminated, may manifest as vertical and horizontal stripes in the final image and human observers are particularly sensitive to these types of image artifacts. Other systems relying on imagery from infrared sensors, such as, for example, automatic target trackers may also suffer from performance degradation, if row and column noise is present.

Because of non-linear behavior of infrared detectors and read-out integrated circuit (ROIC) assemblies, even when a shutter operation or external black body calibration is performed, there may be residual row and column noise (e.g., the scene being imaged may not have the exact same temperature as the shutter). The amount of row and column noise may increase over time, after offset calibration, increasing asymptotically to some maximum value. In one aspect, this may be referred to as 1/f type noise.

In any given frame, the row and column noise may be viewed as high frequency spatial noise. Conventionally, this type of noise may be reduced using filters in the spatial domain (e.g., local linear or non-linear low pass filters) or the frequency domain (e.g., low pass filters in Fourier or Wavelet space). However, these filters may have negative side effects, such as blurring of the image and potential loss of faint details.

It should be appreciated by those skilled in the art that any reference to a column or a row may include a partial column or a partial row and that the terms "row" and "column" are interchangeable and not limiting. Thus, without departing from the scope of the invention, the term "row" may be used to describe a row or a column, and likewise, the term "column" may be used to describe a row or a column, depending upon the application.

Figure 1:
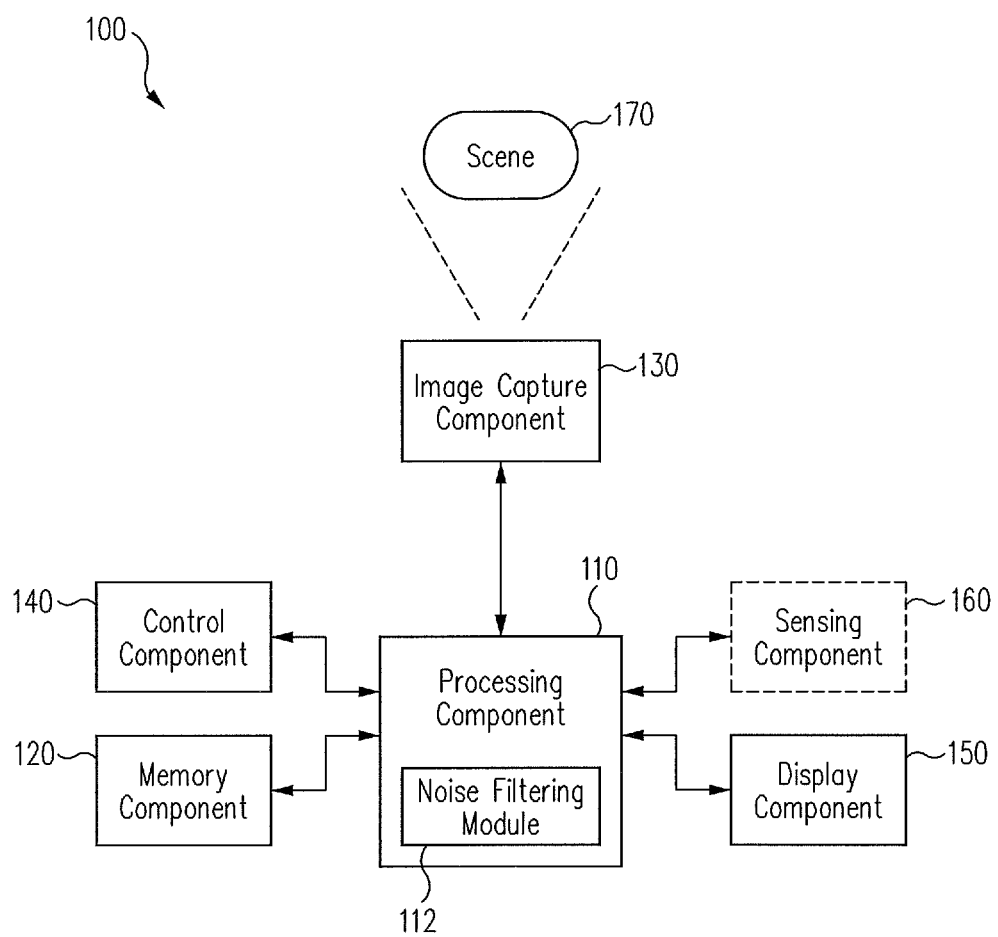
FIG. 1 shows a block diagram of a system for infrared image processing, in accordance with an embodiment of the invention.

FIG. 1 shows a block diagram of a system 100 (e.g., an infrared camera) for infrared image capturing and processing in accordance with an embodiment. The system 100 comprises, in one implementation, a processing component 110, a memory component 120, an image capture component 130, a control component 140, and a display component 150. Optionally, the system 100 may include a sensing component 160.

The system 100 may represent an infrared imaging device, such as an infrared camera, to capture and process images, such as video images of a scene 170. The system 100 may represent any type of infrared camera adapted to detect infrared radiation and provide representative data and information (e.g., infrared image data of a scene). For example, the system 100 may represent an infrared camera that is directed to the near, middle, and/or far infrared spectrums. In another example, the infrared image data may comprise non-uniform data (e.g., real image data that is not from a shutter or black body) of the scene 170, for processing, as set forth herein. The system 100 may comprise a portable device and may be incorporated, e.g., into a vehicle (e.g., an automobile or other type of land-based vehicle, an aircraft, or a spacecraft) or a non-mobile installation requiring infrared images to be stored and/or displayed.

In various embodiments, the processing component 110 comprises a processor, such as one or more of a microprocessor, a single-core processor, a multi-core processor, a microcontroller, a logic device (e.g., a programmable logic device (PLD) configured to perform processing functions), a digital signal processing (DSP) device, etc. The processing component 110 may be adapted to interface and communicate with components 120, 130, 140, and 150 to perform method and processing steps and/or operations, as described herein. The processing component 110 may include a noise filtering module 112 adapted to implement a noise reduction and/or removal algorithm (e.g., a noise filtering algorithm, such as discussed in reference to FIGS. 2A-2C). In one aspect, the processing component 110 may be adapted to perform various other image processing algorithms including scaling the infrared image data, either as part of or separate from the noise filtering algorithm.

It should be appreciated that noise filtering module 112 may be integrated in software and/or hardware as part of the processing component 110, with code (e.g., software or configuration data) for the noise filtering module 112 stored, e.g., in the memory component 120. Embodiments of the noise filtering algorithm, as disclosed herein, may be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 100, with the stored noise filtering algorithm provided to the system 100 by coupling the computer-readable medium to the system 100 and/or by the system 100 downloading (e.g., via a wired link and/or a wireless link) the noise filtering algorithm from the computer-readable medium.

The memory component 120 comprises, in one embodiment, one or more memory devices adapted to store data and information, including infrared data and information. The memory device 120 may comprise one or more various types of memory devices including volatile and non-volatile memory devices, such as RAM (Random Access Memory), ROM (Read-Only Memory), EEPROM (Electrically-Erasable Read-Only Memory), flash memory, etc. The processing component 110 may be adapted to execute software stored in the memory component 120 so as to perform method and process steps and/or operations described herein.

The image capture component 130 comprises, in one embodiment, one or more infrared sensors (e.g., any type of multi-pixel infrared detector, such as a focal plane array) for capturing infrared image data (e.g., still image data and/or video data) representative of an image, such as scene 170. In one implementation, the infrared sensors of the image capture component 130 provide for representing (e.g., converting) the captured image data as digital data (e.g., via an analog-to-digital converter included as part of the infrared sensor or separate from the infrared sensor as part of the system 100). In one aspect, the infrared image data (e.g., infrared video data) may comprise non-uniform data (e.g., real image data) of an image, such as scene 170. The processing component 110 may be adapted to process the infrared image data (e.g., to provide processed image data), store the infrared image data in the memory component 120, and/or retrieve stored infrared image data from the memory component 120. For example, the processing component 110 may be adapted to process infrared image data stored in the memory component 120 to provide processed image data and information (e.g., captured and/or processed infrared image data).

The control component 140 comprises, in one embodiment, a user input and/or interface device, such as a rotatable knob (e.g., potentiometer), push buttons, slide bar, keyboard, etc., that is adapted to generate a user input control signal. The processing component 110 may be adapted to sense control input signals from a user via the control component 140 and respond to any sensed control input signals received therefrom. The processing component 110 may be adapted to interpret such a control input signal as a value, as generally understood by one skilled in the art.

In one embodiment, the control component 140 may comprise a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art. In another implementation, one or more of the push buttons may be used to provide input values (e.g., one or more noise filter values, adjustment parameters, characteristics, etc.) for a noise filter algorithm. For example, one or more push buttons may be used to adjust noise filtering characteristics of infrared images captured and/or processed by the system 100.

The display component 150 comprises, in one embodiment, an image display device (e.g., a liquid crystal display (LCD)) or various other types of generally known video displays or monitors. The processing component 110 may be adapted to display image data and information on the display component 150. The processing component 110 may be adapted to retrieve image data and information from the memory component 120 and display any retrieved image data and information on the display component 150. The display component 150 may comprise display electronics, which may be utilized by the processing component 110 to display image data and information (e.g., infrared images). The display component 150 may be adapted to receive image data and information directly from the image capture component 130 via the processing component 110, or the image data and information may be transferred from the memory component 120 via the processing component 110.

The optional sensing component 160 comprises, in one embodiment, one or more sensors of various types, depending on the application or implementation requirements, as would be understood by one skilled in the art. The sensors of the optional sensing component 160 provide data and/or information to at least the processing component 110. In one aspect, the processing component 110 may be adapted to communicate with the sensing component 160 (e.g., by receiving sensor information from the sensing component 160) and with the image capture component 130 (e.g., by receiving data and information from the image capture component 130 and providing and/or receiving command, control, and/or other information to and/or from one or more other components of the system 100).

In various implementations, the sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. The sensing component 160 may represent conventional sensors as generally known by one skilled in the art for monitoring various conditions (e.g., environmental conditions) that may have an effect (e.g., on the image appearance) on the data provided by the image capture component 130.

In some implementations, the optional sensing component 160 (e.g., one or more of sensors) may comprise devices that relay information to the processing component 110 via wired and/or wireless communication. For example, the optional sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 100 may be combined and/or implemented or not, as desired or depending on the application or requirements, with the system 100 representing various functional blocks of a related system. In one example, the processing component 110 may be combined with the memory component 120, the image capture component 130, the display component 150, and/or the optional sensing component 160. In another example, the processing component 110 may be combined with the image capture component 130 with only certain functions of the processing component 110 performed by circuitry (e.g., a processor, a microprocessor, a logic device, a microcontroller, etc.) within the image capture component 130. Furthermore, various components of the system 100 may be remote from each other (e.g., image capture component 130 may comprise a remote sensor with processing component 110, etc. representing a computer that may or may not be in communication with the image capture component 130).

Figure 2A:
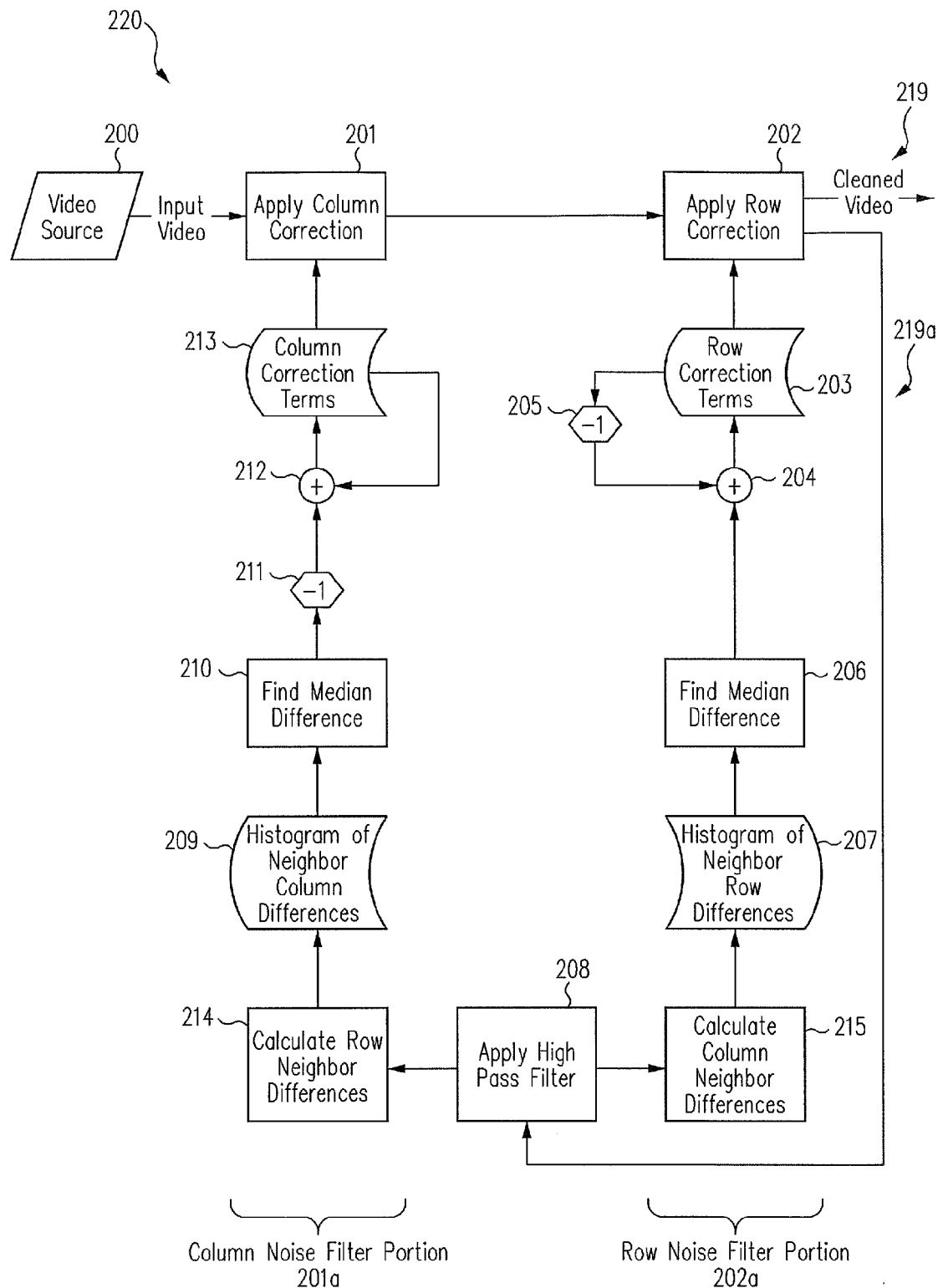
FIGS. 2A-2C are flowcharts illustrating methods for noise filtering an infrared image, in accordance with embodiments of the invention.

In accordance with an embodiment of the invention, FIG. 2A shows a method 220 for noise filtering an infrared image. In one implementation, this method 220 relates to the reduction and/or removal of temporal, 1/f, and/or fixed spatial noise in infrared imaging devices, such as infrared imaging system 100 of FIG. 1. The method 220 is adapted to utilize the row and column based noise components of infrared image data in a noise filtering algorithm. In one aspect, the row and column based noise components may dominate the noise in imagery of infrared sensors (e.g., approximately ⅔ of the total noise may be spatial in a typical micro-bolometer based system).

In one embodiment, the method 220 of FIG. 2A comprises a high level block diagram of row and column noise filtering algorithms. In one aspect, the row and column noise filter algorithms may be optimized to use minimal hardware resources.

Referring to FIG. 2A, the process flow of the method 220 implements a recursive mode of operation, wherein the previous correction terms are applied before calculating row and column noise, which may allow for correction of lower spatial frequencies. In one aspect, the recursive approach is useful when row and column noise is spatially correlated. This is sometimes referred to as banding and, in the column noise case, may manifest as several neighboring columns being affected by a similar offset error. When several neighbors used in difference calculations are subject to similar error, the mean difference used to calculate the error may be skewed, and the error may only be partially corrected. By applying partial correction prior to calculating the error in the current frame, correction of the error may be recursively reduced until the error is minimized or eliminated. In the recursive case, if the HPF is not applied (block 208), then natural gradients as part of the image may, after several iterations, be distorted when merged into the noise model. In one aspect, a natural horizontal gradient may appear as low spatially correlated column noise (e.g., severe banding). In another aspect, the HPF may prevent very low frequency scene information to interfere with the noise estimate and, therefore, limits the negative effects of recursive filtering.

Referring to method 220 of FIG. 2A, infrared image data (e.g., a raw video source, such as from the image capture component 130 of FIG. 1) is received as input video data (block 200). Next, column correction terms are applied to the input video data (block 201), and row correction terms are applied to the input video data (block 202). Next, video data (e.g., "cleaned" video data) is provided as output video data (219) after column and row corrections are applied to the input video data. In one aspect, the term "cleaned" may refer to removing or reducing noise (blocks 201, 202) from the input video data via, e.g., one or more embodiments of the noise filter algorithm.

Referring to the processing portion (e.g., recursive processing) of FIG. 2A, a HPF is applied (block 208) to the output video data 219 via data signal path 219*a*. In one implementation, the high pass filtered data is separately provided to a column noise filter portion 201*a* and a row noise filter portion 202*a*.

Referring to the column noise filter portion 201*a*, the method 220 may be adapted to process the input video data 200 and/or output video data 219 as follows:

1. Apply previous column noise correction terms to a current frame as calculated in a previous frame (block 201).

2. High pass filter the row of the current frame by subtracting the result of a low pass filter (LPF) operation (block 208), for example, as discussed in reference to FIGS. 3A-3C.

3. For each pixel, calculate a difference between a center pixel and one or more (e.g., eight) nearest neighbors (block 214). In one implementation, the nearest neighbors comprise one or more nearest horizontal neighbors. The nearest neighbors may include one or more vertical or other non-horizontal neighbors (e.g., not pure horizontal, i.e., on the same row), without departing from the scope of the invention.

4. If the calculated difference is below a predefined threshold, add the calculated difference to a histogram of differences for the specific column (block 209).

5. At an end of the current frame, find a median difference by examining a cumulative histogram of differences (block 210). In one aspect, for added robustness, only differences with some specified minimum number of occurrences may be used.

6. Delay the current correction terms for one frame (block 211), i.e., they are applied to the next frame.

7. Add median difference (block 212) to previous column correction terms to provide updated column correction terms (block 213).

8. Apply updated column noise correction terms in the next frame (block 201).

Referring to the row noise filter portion 202a, the method 220 may be adapted to process the input video data 200 and/or output video data 219 as follows:

1. Apply previous row noise correction terms to a current frame as calculated in a previous frame (block 202).

2. High pass filter the column of the current frame by subtracting the result of a low pass filter (LPF) operation (block 208), as discussed similarly above for column noise filter portion 201a.

3. For each pixel, calculate a difference between a center pixel and one or more (e.g., eight) nearest neighbors (block 215). In one implementation, the nearest neighbors comprise one or more nearest vertical neighbors. The nearest neighbors may include one or more horizontal or other non-vertical neighbors (e.g., not pure vertical, i.e., on the same column), without departing from the scope of the invention.

4. If the calculated difference is below a predefined threshold, add the calculated difference to a histogram of differences for the specific row (block 207).

5. At an end of the current row (e.g., line), find a median difference by examining a cumulative histogram of differences (block 206). In one aspect, for added robustness only differences with some specified minimum number of occurrences may be used.

6. Delay the current frame by a time period equivalent to the number of nearest vertical neighbors used, for example eight.

7. Add median difference (block 204) to row correction terms (block 203) from previous frame (block 205).

8. Apply updated row noise correction terms in the current frame (block 202). In one aspect, this may require a row buffer (e.g., as mentioned in 6).

In one aspect, for all pixels (or at least a large subset of them) in each column, an identical offset term (or set of terms) may be applied for each associated column. This may prevent the filter from blurring spatially local details.

Similarly, in one aspect, for all pixels (or at least a large subset of them) in each row respectively, an identical offset term (or set of terms) may be applied. This may inhibit the filter from blurring spatially local details.

In one example, an estimate of the column offset terms may be calculated using only a subset of the rows (e.g., the first 32 rows). In this case, only a 32 row delay is needed to apply the column correction terms in the current frame. This may improve filter performance in removing high temporal frequency column noise. Alternatively, the filter may be designed with minimum delay, and the correction terms are only applied once a reasonable estimate can be calculated (e.g., using data from the 32 rows). In this case, only rows 33 and beyond may be optimally filtered.

In one aspect, all samples may not be needed, and in such an instance, only every $2^{nd}$ or $4^{th}$ row, e.g., may be used for calculating the column noise. In another aspect, the same may apply when calculating row noise, and in such an instance, only data from every $4^{th}$ column, e.g., may be used. It should be appreciated that various other iterations may be used by one skilled in the art without departing from the scope of the invention.

In one aspect, the filter may operate in recursive mode in which the filtered data is filtered instead of the raw data being filtered. In another aspect, the mean difference between a pixel in one row and pixels in neighboring rows may be approximated in an efficient way if a recursive (IIR) filter is used to calculate an estimated running mean. For example, instead of taking the mean of neighbor differences (e.g., eight neighbor differences), the difference between a pixel and the mean of the neighbors may be calculated.

Figure 2B:
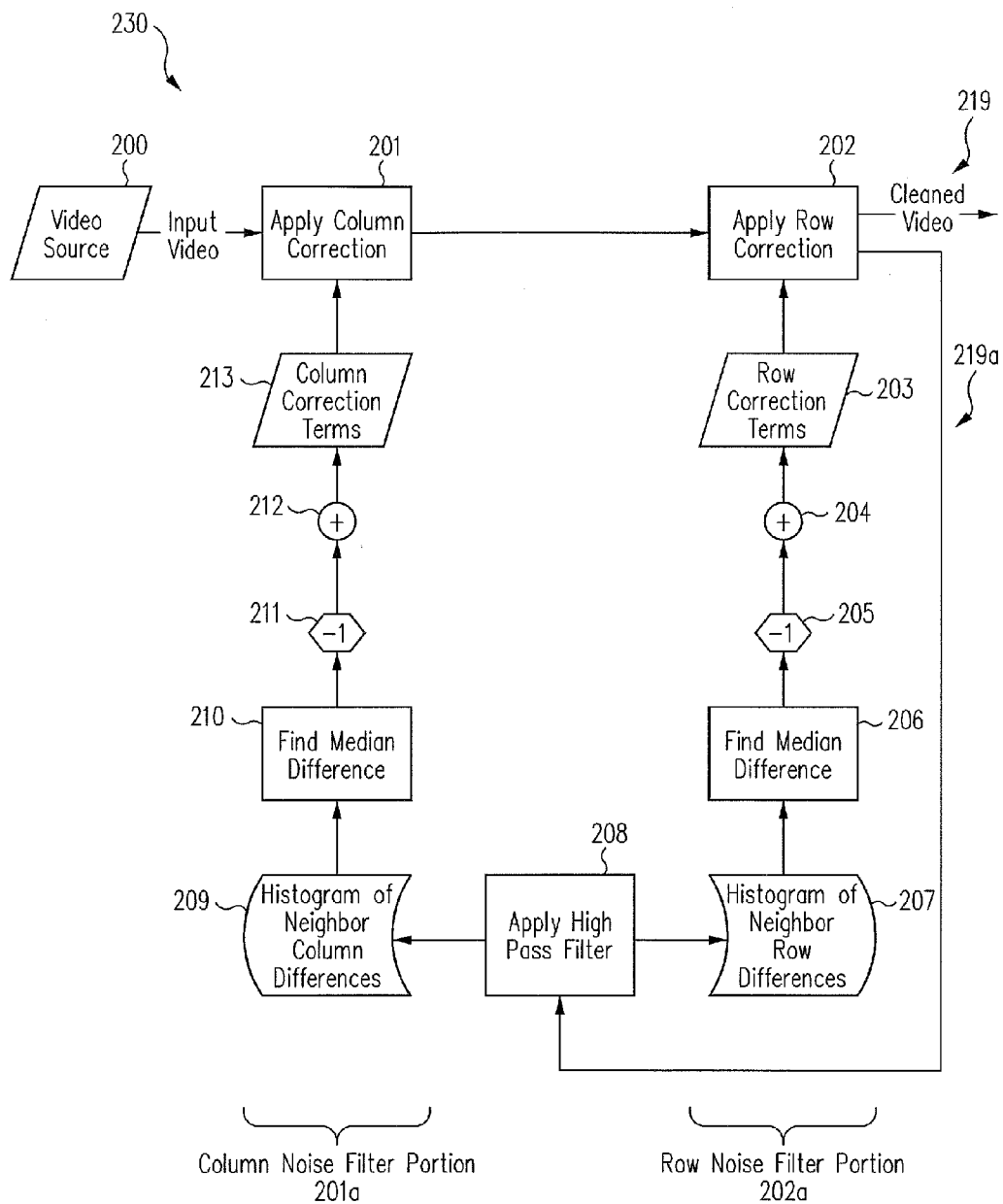

In accordance with an embodiment of the invention, FIG. 2B shows an alternative method 230 for noise filtering infrared image data. In reference to FIGS. 2A and 2B, one or more of the process steps and/or operations of method 220 of FIG. 2A have changed order or have been altered or combined for the method 230 of FIG. 2B. For example, the operation of calculating row and column neighbor differences (blocks 214, 215) may be removed or combined with other operations, such as generating histograms of row and column neighbor differences (blocks 207, 209). In another example, the delay operation (block 205) may be performed after finding the median difference (block 206). In various examples, it should be appreciated that similar process steps and/or operations have similar scope, as previously described in FIG. 2A, and therefore, the description will not be repeated.

In still other alternate approaches to methods 220 and 230, embodiments may exclude the histograms and rely on mean calculated differences instead of median calculated differences. In one aspect, this may be slightly less robust but may allow for a simpler implementation of the column and row noise filters. For example, the mean of neighboring rows and columns, respectively, may be approximated by a running mean implemented as an infinite impulse response (IIR) filter. In the row noise case, the IIR filter implementation may reduce or even eliminate the need to buffer several rows of data for mean calculations.

In still other alternate approaches to methods 220 and 230, new noise estimates may be calculated in each frame of the video data and only applied in the next frame (e.g., after noise estimates). In one aspect, this alternate approach may provide less performance but may be easier to implement. In another aspect, this alternate approach may be referred to as a non-recursive method, as understood by those skilled in the art.

Figure 2C:
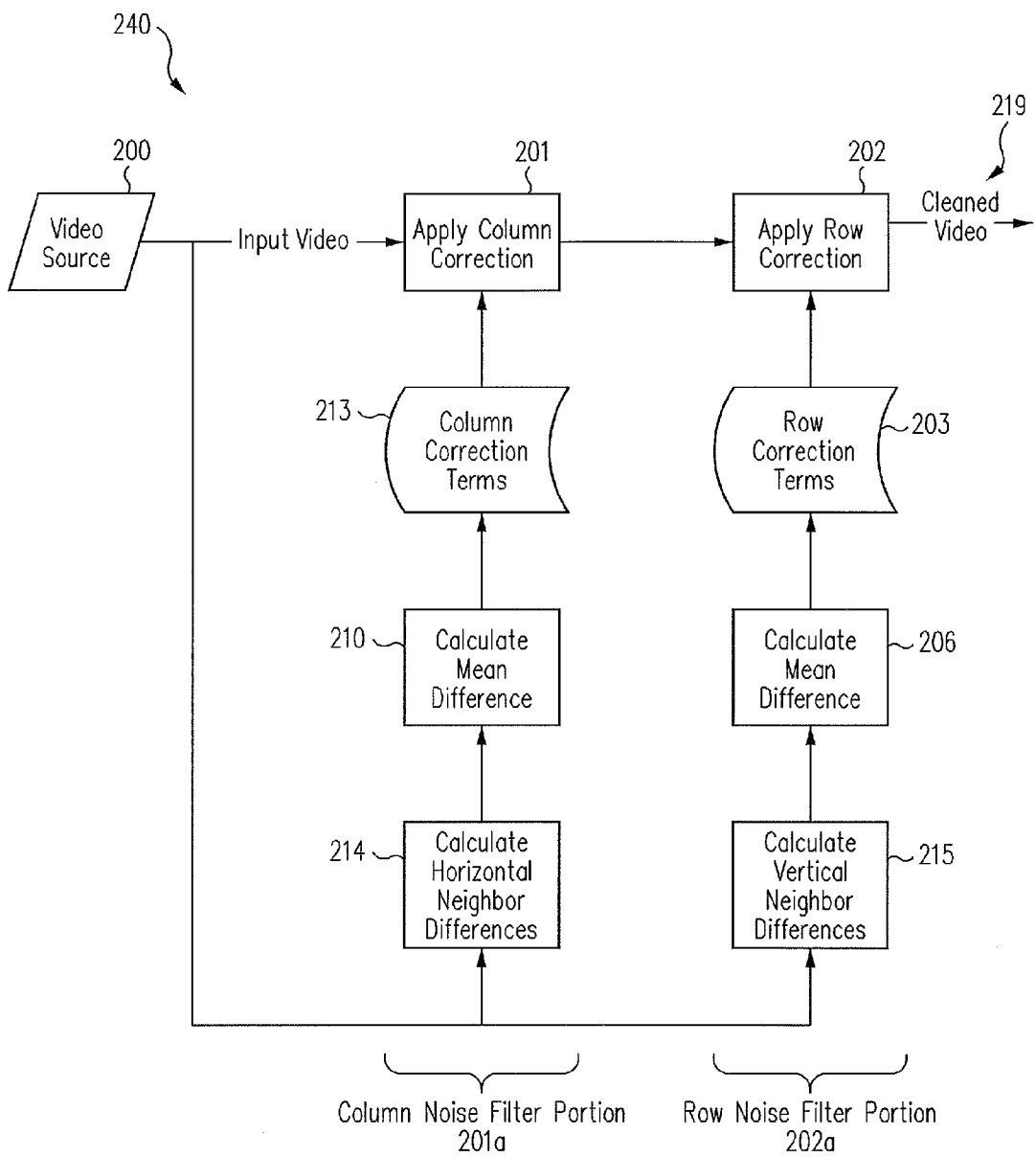

For example, in one embodiment, the method 240 of FIG. 2C comprises a high level block diagram of row and column noise filtering algorithms. In one aspect, the row and column noise filter algorithms may be optimized to use minimal hardware resources. In reference to FIGS. 2A and 2B, similar process steps and/or operations may have similar scope, and therefore, the descriptions will not be repeated.

Referring to FIG. 2C, the process flow of the method 240 implements a non-recursive mode of operation. As shown, the method 240 applies column offset correction term 201 and row offset correction term 202 to the uncorrected input video data from video source 200 to produce, e.g., a corrected or cleaned output video signal 219. In column noise filter portion 201a, column offset correction terms 213 are calculated based on the mean difference 210 between pixel values in a specific column and one or more pixels belonging to neighboring columns 214. In row noise filter portion 202a, row offset correction terms 203 are calculated based on the mean difference 206 between pixel values in a specific row and one or more pixels belonging to neighboring rows 215. In one aspect, the order (e.g., rows first or columns first) in which row or column offset correction terms 203, 213 are applied to the input video data from video source 200 may be considered arbitrary. In another aspect, the row and column correction terms may not be fully known until the end of the video frame, and therefore, if the input video data from the video source 200 is not delayed, the row and column correction terms 203, 213 may not be applied to the input video data from which they where calculated.

In one aspect of the invention, the column and row noise filter algorithm may operate continuously on image data provided by an infrared imaging sensor (e.g., image capture component 130 of FIG. 1). Unlike conventional methods that may require a uniform scene (e.g., as provided by a shutter or external calibrated black body) to estimate the spatial noise, the column and row noise filter algorithms, as set forth in one or more embodiments, may operate on real-time scene data. In one aspect, an assumption may be made that, for some small neighborhood around location [x, y], neighboring infrared sensor elements should provide similar values since they are imaging parts of the scene in close proximity. If the infrared sensor reading from a particular infrared sensor element differs from a neighbor, then this could be the result of spatial noise. However, in some instances, this may not be true for each and every sensor element in a particular row or column (e.g., due to local gradients that are a natural part of the scene), but on average, a row or column may have values that are close to the values of the neighboring rows and columns.

For one or more embodiments, by first taking out one or more low spatial frequencies (e.g., using a high pass filter (HPF)), the scene contribution may be minimized to leave differences that correlate highly with actual row and column spatial noise. In one aspect, by using an edge preserving filter, such as a Median filter or a Bilateral filter, one or more embodiments may minimize artifacts due to strong edges in the image.

Figure 3A:
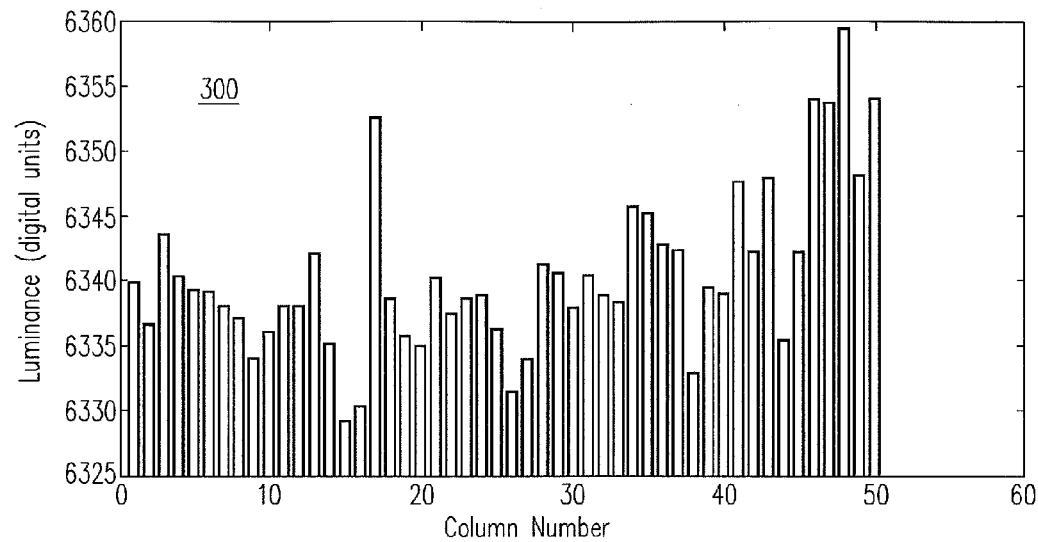
FIGS. 3A-3C are graphs illustrating infrared image data and the processing of an infrared image, in accordance with embodiments of the invention.
Figure 3B:
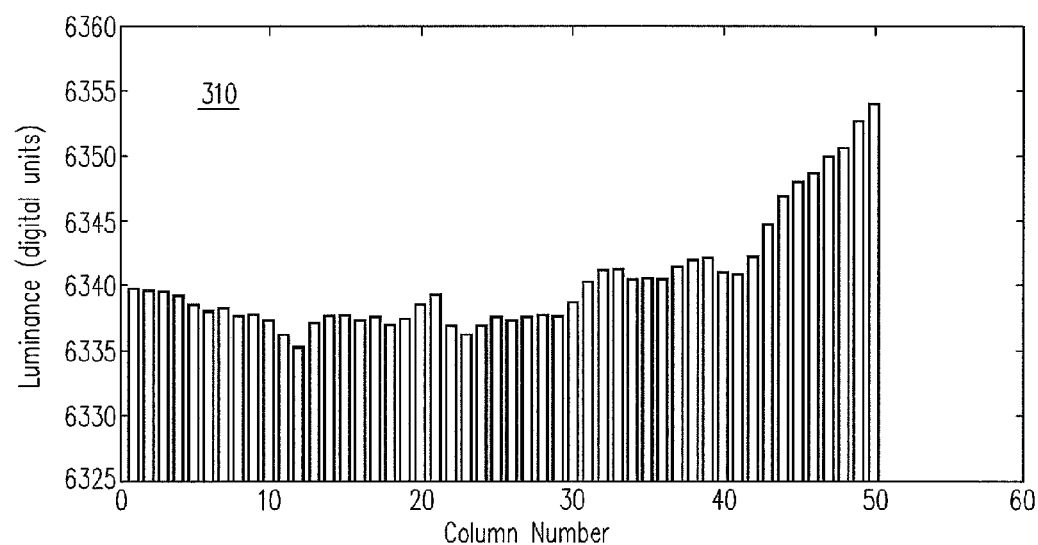
Figure 3C:
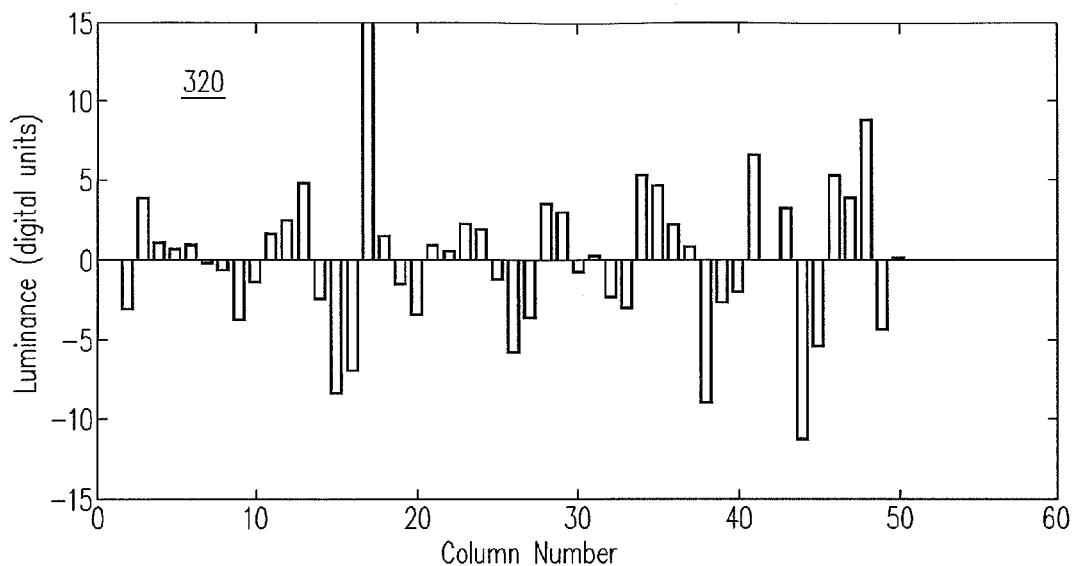

In accordance with one or more embodiments of the invention, FIGS. 3A to 3C show a graphical implementation (e.g., digital counts versus data columns) of filtering an infrared image. FIG. 3A shows a graphical illustration (e.g., graph 300) of typical values, as an example, from a row of sensor elements when imaging a scene. FIG. 3B shows a graphical illustration (e.g., graph 310) of a result of a low pass filtering (LPF) of the image data values from FIG. 3A. FIG. 3C shows a graphical illustration (e.g., graph 320) of subtracting the low pass filter (LPF) output in FIG. 3B from the original image data in FIG. 3A, which results in a high pass filter (HPF) profile with low and mid frequency components removed from the scene of the original image data in FIG. 3A. Thus, FIG. 3A-3C illustrate a HPF technique, which may be used for one or more embodiments (e.g., as with methods 220 and/or 230).

In one aspect of the invention, a final estimate of column and/or row noise may be referred to as an average or median estimate of all of the measured differences. Because noise characteristics of an infrared sensor are often generally known, then one or more thresholds may be applied to the noise estimates. For example, if a difference of 60 digital counts is measured, but it is known that the noise typically is less than 10 digital counts, then this measurement may be ignored.

Figure 4:
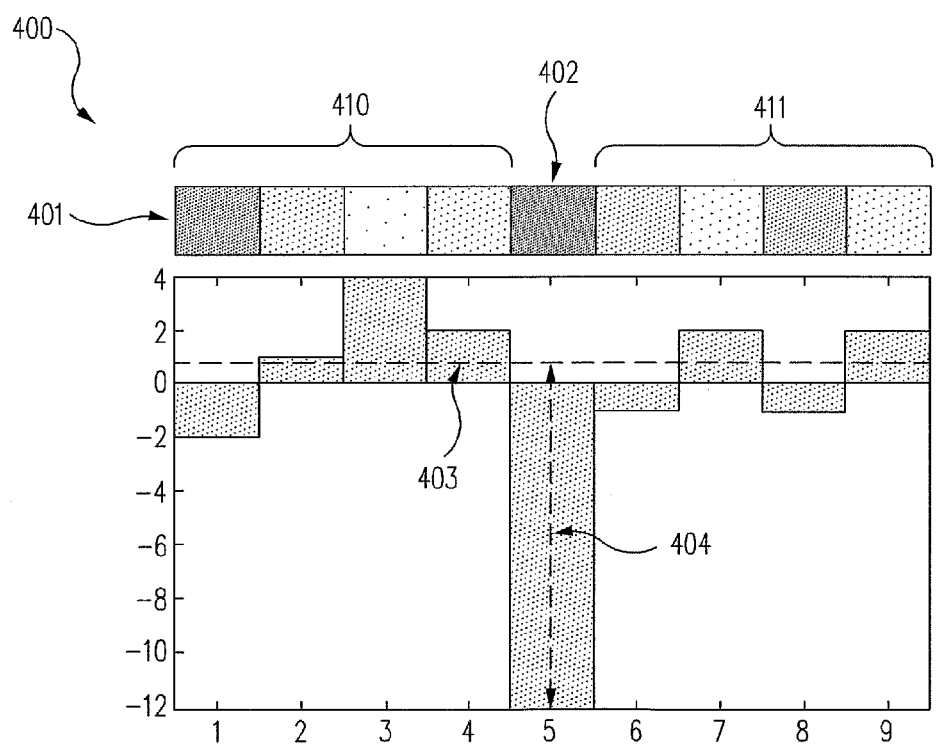
FIG. 4 shows a portion of a row of sensor data for discussing processing techniques, in accordance with embodiments of the invention.

In accordance with one or more embodiments of the invention, FIG. 4 shows a graphical illustration 400 (e.g., digital counts versus data columns) of a row of sensor data 401 (e.g., a row of pixel data for a plurality of pixels in a row) with column 5 data 402 and data for eight nearest neighbors (e.g., nearest pixel neighbors, 4 columns 410 to the left of column 5 data 402 and 4 columns 411 to the right of column 5 data 402). In one aspect, referring to FIG. 4, the row of sensor data 401 is part of a row of sensor data for an image or scene captured by a multi-pixel infrared sensor or detector (e.g., image capture component 130 of FIG. 1). In one aspect, column 5 data 402 is a column of data to be corrected. For this row of sensor data 401, the difference between column 5 data 402 and a mean 403 of its neighbor columns (410, 411) is indicated by an arrow 404. Therefore, noise estimates may be obtained and accounted for based on neighboring data.

Figure 5A:
FIGS. 5A to 5C show an exemplary implementation of column and row noise filtering for an infrared image, in accordance with embodiments of the invention.
Figure 5A:
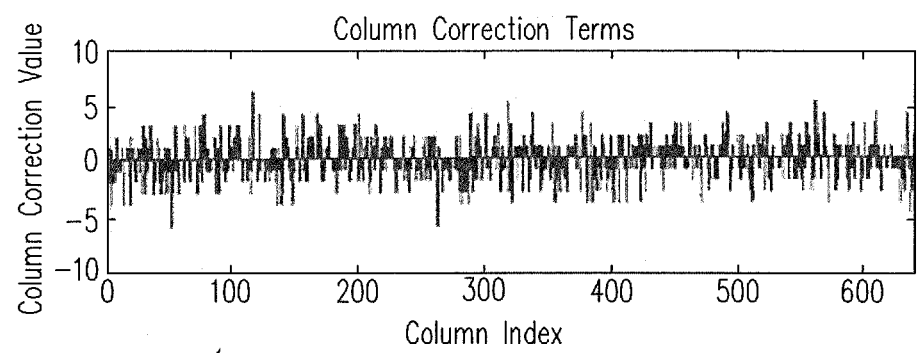
Figure 5B:
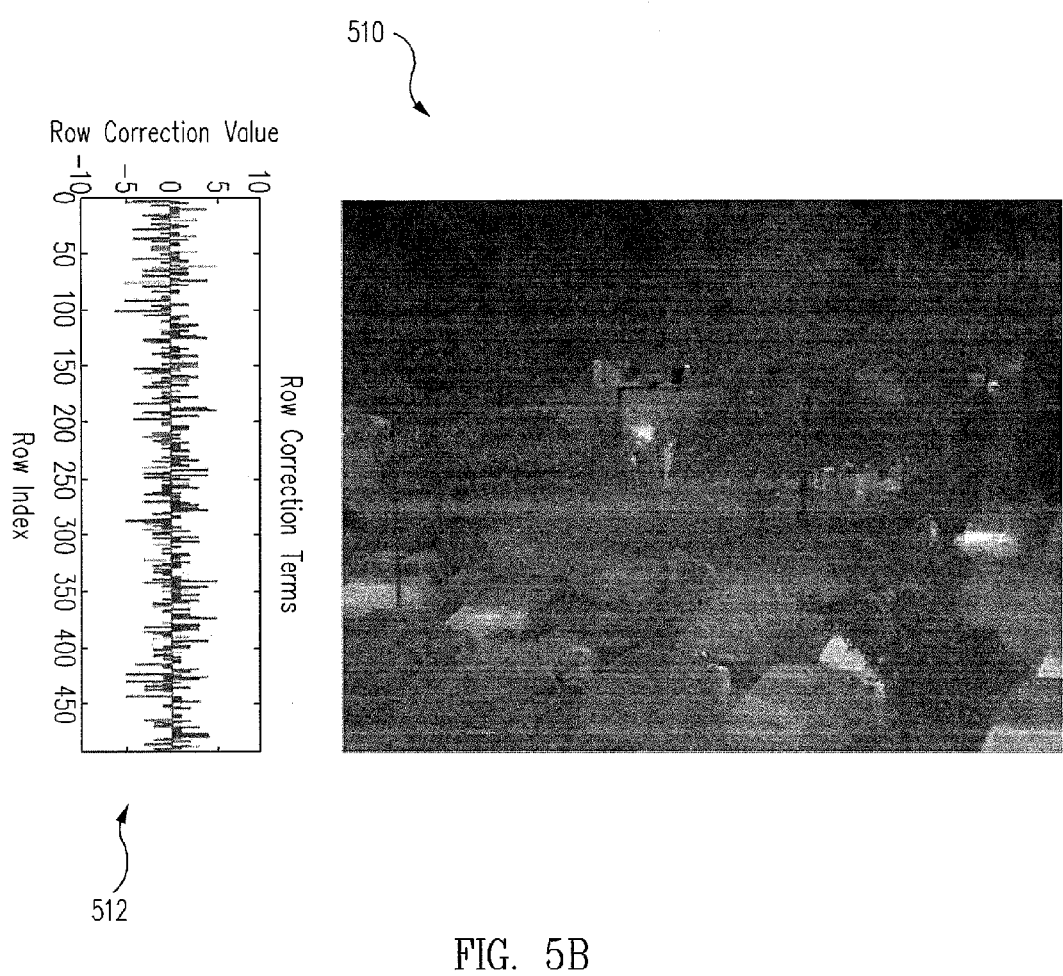
Figure 5C:

In accordance with one or more embodiments of the invention, FIGS. 5A to 5C show an exemplary implementation of column and row noise filtering an infrared image (e.g., an image frame from infrared video data). FIG. 5A shows an infrared image 500 with column noise estimated from a scene with severe row and column noise present and a corresponding graph 502 of column correction terms. FIG. 5B shows an infrared image 510, with column noise removed and spatial row noise still present, with row correction terms estimated from the scene in FIG. 5A and a corresponding graph 512 of row correction terms. FIG. 5C shows an infrared image 520 of the scene in FIG. 5A as a cleaned infrared image with row and column noise removed (e.g., column and row correction terms of FIGS. 5A-5B applied).

In one embodiment, FIG. 5A shows an infrared video frame (i.e., infrared image 500) with severe row and column noise. Column noise correction coefficients are calculated as described herein to produce, e.g., 639 correction tetras, i.e., one correction term per column. The graph 502 shows the column correction terms. These offset correction terms are subtracted from the infrared video frame 500 of FIG. 5A to produce the infrared image 510 in FIG. 5B. As shown in FIG. 5B, the row noise is still present. Row noise correction coefficients are calculated as described herein to produce, e.g., 639 row terms, i.e., one correction term per row. The graph 512 shows the row offset correction terms, which are subtracted from the infrared image 510 in FIG. 5B to produce the cleaned infrared image 520 in FIG. 5C with significantly reduced or removed row and column noise.

In various embodiments, it should be understood that both row and column filtering is not required. For example, either column noise filtering 201a or row noise filtering 202a may be performed in methods 220, 230 or 240.

It should be appreciated that any reference to a column or a row may include a partial column or a partial row and that the terms "row" and "column" are interchangeable and not limiting. For example, without departing from the scope of the invention, the term "row" may be used to describe a row or a column, and likewise, the term "column" may be used to describe a row or a column, depending upon the application.

In various aspects, column and row noise may be estimated by looking at a real scene (e.g., not a shutter or a black body), in accordance with embodiments of the noise filtering algorithms, as disclosed herein. The column and row noise may be estimated by measuring the median or mean difference between sensor readings from elements in a specific row (and/or column) and sensor readings from adjacent rows (and/or columns).

Optionally, a high pass filter may be applied to the image data prior to measuring the differences, which may reduce or at least minimize a risk of distorting gradients that are part of the scene and/or introducing artifacts. In one aspect, only sensor readings that differ by less than a configurable threshold may be used in the mean or median estimation. Optionally, a histogram may be used to effectively estimate the median. Optionally, only histogram bins exceeding a minimum count may be used when finding the median estimate from the histogram. Optionally, a recursive IIR filter may be used to estimate the difference between a pixel and its neighbors, which may reduce or at least minimize the need to store image data for processing, e.g., the row noise portion (e.g., if image data is read out row wise from the sensor). In one implementation, the current mean column value $\overline{C}_{i,j}$ for column i at row j may be estimated using the following recursive filter algorithm.

$$\overline{C}_{i,j} = (1-\alpha) \cdot \overline{C}_{i-1,j} + \alpha \cdot C_{i,j}$$

$$\Delta R_i = \frac{1}{N} \sum_{j=1}^{N} C_{i,j} - \overline{C}_{i-1,j}$$

In this equation α is the damping factor and may be set to for example 0.2 in which case the estimate for the running mean of a specific column i at row j will be a weighted sum of the estimated running mean for column i−1 at row j and the current pixel value at row j and column i. The estimated difference between values of row j and the values of neighboring rows can now be approximated by taking the difference of each value $C_{i,j}$ and the running recursive mean of the neighbors above row i ($\overline{C}_{i-1,j}$). Estimating the mean difference this way is not as accurate as taking the true mean difference since only rows above are used but it requires that only one row of running means are stored as compared to several rows of actual pixel values be stored.

In one embodiment, referring to FIG. 2A, the process flow of method 220 may implement a recursive mode of operation, wherein the previous column and row correction terms are applied before calculating row and column noise, which allows for correction of lower spatial frequencies when the image is high pass filtered prior to estimating the noise.

Generally, during processing, a recursive filter re-uses at least a portion of the output data as input data. The feedback input of the recursive filter may be referred to as an infinite impulse response (IIR), which may be characterized, e.g., by exponentially growing output data, exponentially decaying output data, or sinusoidal output data. In some implementations, a recursive filter may not have an infinite impulse response. As such, e.g., some implementations of a moving average filter function as recursive filters but with a finite impulse response (FIR).

As further set forth in the description of FIGS. 6A to 9B, additional techniques are contemplated to determine row and/or column correction terms. For example, in some embodiments, such techniques may be used to provide correction terms without overcompensating for the presence of vertical and/or horizontal objects present in scene 170. Such techniques may be used in any appropriate environment where such objects may be frequently captured including, for example, urban applications, rural applications, vehicle applications, and others. In some embodiments, such techniques may provide correction terms with reduced memory and/or reduced processing overhead in comparison with other approaches used to determine correction terms.

Figure 6A:
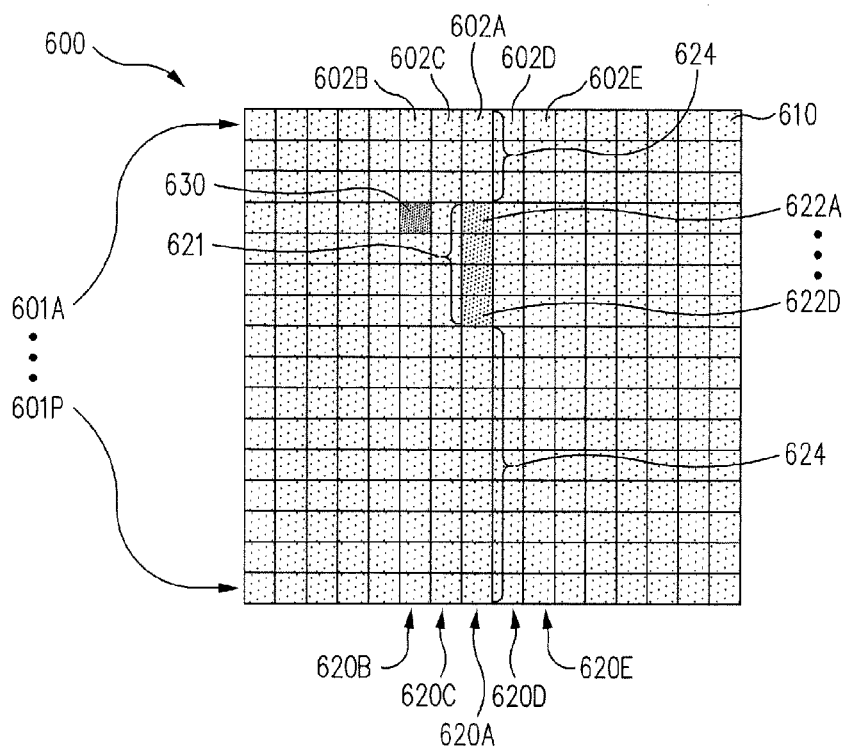
FIG. 6A shows an infrared image of a scene including small vertical structure, in accordance with an embodiment of the invention.

FIG. 6A shows an infrared image 600 (e.g., infrared image data) of scene 170 in accordance with an embodiment of the invention. Although infrared image 600 is depicted as having 16 rows and 16 columns, other image sizes are contemplated for infrared image 600 and the various other infrared images discussed herein. For example, in one embodiment, infrared image 600 may have 640 columns and 512 rows.

In FIG. 6A, infrared image 600 depicts scene 170 as relatively uniform, with a majority of pixels 610 of infrared image 600 having the same or similar intensity (e.g., the same or similar numbers of digital counts). Also in this embodiment, scene 170 includes an object 621 which appears in pixels 622A-D of a column 620A of infrared image 600. In this regard, pixels 622A-D are depicted somewhat darker than other pixels 610 of infrared image 600. For purposes of discussion, it will be assumed that darker pixels are associated with higher numbers of digital counts, however lighter pixels may be associated with higher numbers of digital counts in other implementations if desired. As shown, the remaining pixels 624 of column 620A have a substantially uniform intensity with pixels 610.

In some embodiments, object 621 may be a vertical object such as a building, telephone pole, light pole, power line, cellular tower, tree, human being, and/or other object. If image capture component 130 is disposed in a vehicle approaching object 621, then object 621 may appear relatively fixed in infrared image 600 while the vehicle is still sufficiently far away from object 621 (e.g., object 621 may remain primarily represented by pixels 622A-D and may not significantly shift position within infrared image 600). If image capture component 130 is disposed at a fixed location relative to object 621, then object 621 may also appear relatively fixed in infrared image 600 (e.g., if object 621 is fixed and/or is positioned sufficiently far away). Other dispositions of image capture component 130 relative to object 621 are also contemplated.

Infrared image 600 also includes another pixel 630 which may be attributable to, for example, temporal noise, fixed spatial noise, a faulty sensor/circuitry, actual scene information, and/or other sources. As shown in FIG. 6A, pixel 630 is darker (e.g., has a higher number of digital counts) than all of pixels 610 and 622A-D.

Vertical objects such as object 621 depicted by pixels 622A-D are often problematic for some column correction techniques. In this regard, objects that remain disposed primarily in one or several columns may result in overcompensation when column correction terms are calculated without regard to the possible presence of small vertical objects appearing in scene 170. For example, when pixels 622A-D of column 602A are compared with those of nearby columns 620B-E, some column correction techniques may interpret pixels 622A-D as column noise, rather than actual scene information. Indeed, the significantly darker appearance of pixels 622A-D relative to pixels 610 and the relatively small width of object 621 disposed in column 620A may skew the calculation of a column correction term to significantly correct the entire column 620A, although only a small portion of column 620A actually includes darker scene information. As a result, the column correction term determined for column 620A may significantly lighten (e.g., brighten or reduce the number of digital counts) column 620A to compensate for the assumed column noise.

Figure 6B:
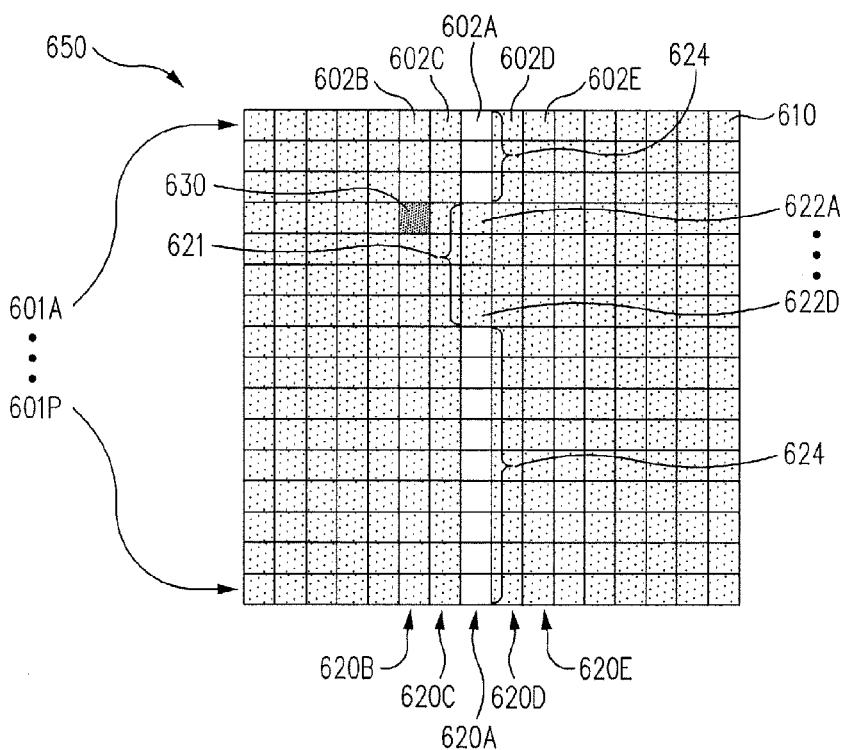
FIG. 6B shows a corrected version of the infrared image of FIG. 6A, in accordance with an embodiment of the invention.

For example, FIG. 6B shows a corrected version 650 of infrared image 600 of FIG. 6A. As shown in FIG. 6B, column 620A has been significantly brightened. Pixels 622A-D have been made significantly lighter to be approximately uniform with pixels 610, and the actual scene information (e.g., the depiction of object 621) contained in pixels 622A-D has been mostly lost. In addition, remaining pixels 624 of column 620A have been significantly brightened such that they are no longer substantially uniform with pixels 610. Indeed, the column correction term applied to column 620A has actually introduced new non-uniformities in pixels 624 relative to the rest of scene 170.

Various techniques described herein may be used to determine column correction terms without overcompensating for the appearance of various vertical objects that may be present in scene 170. For example, in one embodiment, when such techniques are applied to column 620A of FIG. 6A, the presence of dark pixels 622A-D may not cause any further changes to the column correction term for column 620A (e.g., after correction is applied, column 620A may appear as shown in FIG. 6A rather than as shown in FIG. 6B).

In accordance with various embodiments further described herein, corresponding column correction terms may be determined for each column of an infrared image without overcompensating for the presence of vertical objects present in scene 170. In this regard, a first pixel of a selected column of an infrared image (e.g., the pixel of the column residing in a particular row) may be compared with a corresponding set of other pixels (e.g., also referred to as neighborhood pixels) that are within a neighborhood associated with the first pixel. In some embodiments, the neighborhood may correspond to pixels in the same row as the first pixel that are within a range of columns. For example, the neighborhood may be defined by an intersection of: the same row as the first pixel; and a predetermined range of columns.

The range of columns may be any desired number of columns on the left side, right side, or both left and right sides of the selected column. In this regard, if the range of columns corresponds to two columns on both sides of the selected column, then four comparisons may be made for the first pixel (e.g., two columns to the left of the selected column, and two columns to the right of the selected column). Although a range of two columns on both sides of the selected column is further described herein, other ranges are also contemplated (e.g., 5 columns, 8 columns, or any desired number of columns).

One or more counters (e.g., registers, memory locations, accumulators, and/or other implementations in processing component 110, noise filtering module 112, memory component 120, and/or other components) are adjusted (e.g., incremented, decremented, or otherwise updated) based on the comparisons. In this regard, for each comparison where the pixel of the selected column has a lesser value than a compared pixel, a counter A may be adjusted. For each comparison where the pixel of the selected column has an equal (e.g., exactly equal or substantially equal) value as a compared pixel, a counter B may be adjusted. For each comparison where the pixel of the selected column has a greater value than a compared pixel, a counter C may be adjusted. Thus, if the range of columns corresponds to two columns on either side of the selected column as identified in the example above, then a total of four adjustments (e.g., counts) may be collectively held by counters A, B, and C.

After the first pixel of the selected column is compared with all pixels in its corresponding neighborhood, the process is repeated for all remaining pixels in the selected column (e.g., one pixel for each row of the infrared image), and counters A, B, and C continue to be adjusted in response to the comparisons performed for the remaining pixels. In this regard, in some embodiments, each pixel of the selected column may be compared with a different corresponding neighborhood of pixels (e.g., pixels residing: in the same row as the pixel of the selected column; and within a range of columns), and counters A, B, and C may be adjusted based on the results of such comparisons.

As a result, after all pixels of the selected column are compared, counters A, B, and C may identify the number of comparisons for which pixels of the selected column were found to be greater, equal, or less than neighborhood pixels. Thus, continuing the example above, if the infrared image has 16 rows, then a total of 64 counts may be distributed across counters A, B, and C for the selected column (e.g., 4 counts per row×16 rows=64 counts). It is contemplated that other numbers of counts may be used. For example, in a large array having 512 rows and using a range of 10 columns, 5120 counts (e.g., 512 rows×10 columns) may be used to determine each column correction term.

Based on the distribution of the counts in counters A, B, and C, the column correction term for the selected column may be selectively incremented, decremented, or remain the same based on one or more calculations performed using values of one or more of counters A, B, and/or C. For example, in some embodiments: the column correction term may be incremented if counter A−counter B−counter C>D; the column correction term may be decremented if counter C−counter A−counter B>D; and the column correction term may remain the same in all other cases. In such embodiments, D may be a value such as a constant value smaller than the total number of comparisons accumulated by counters A, B, and C per column. For example, in one embodiment, D may have a value equal to: (number of rows)/2.

The process may be repeated for all remaining columns of the infrared image in order to determine (e.g., calculate and/or update) a corresponding column correction term for each column of the infrared image. In addition, after column correction terms have been determined for one or more columns, the process may be repeated for one or more columns (e.g., to increment, decrement, or not change one or more column correction terms) after the column corrected terms are applied to the same infrared image and/or another infrared image (e.g., a subsequently captured infrared image).

As discussed, counters A, B, and C identify the number of compared pixels that are less than, equal to, or greater than pixels of the selected column. This contrasts with various other techniques used to determine column correction terms where the actual differences (e.g., calculated difference values) between compared pixels may be used.

Figure 7A:
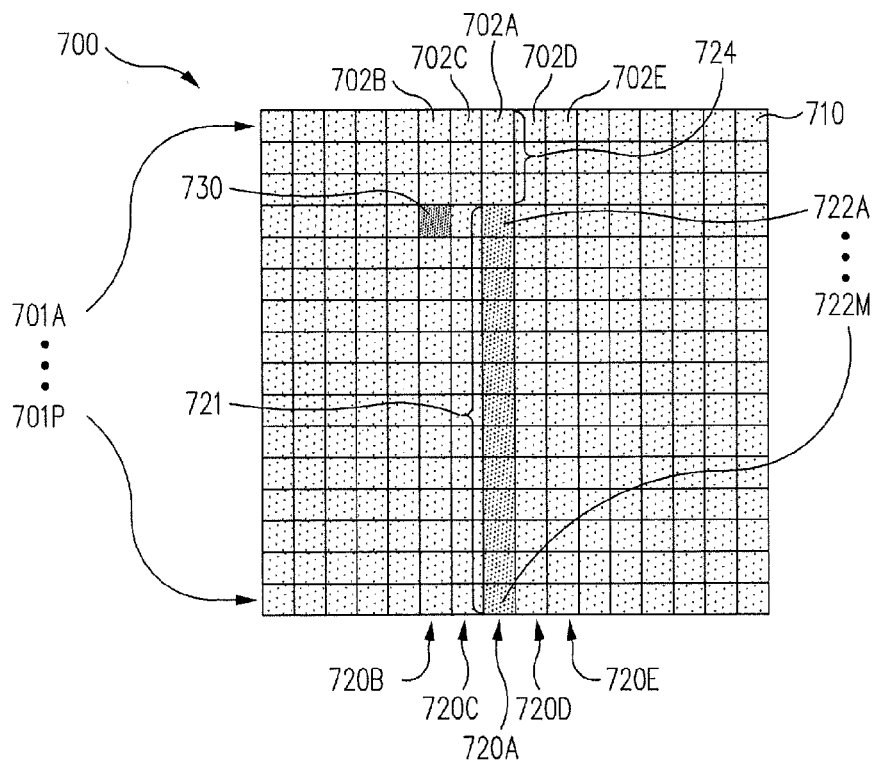
FIG. 7A shows an infrared image of a scene including a large vertical structure, in accordance with an embodiment of the invention.
Figure 7B:
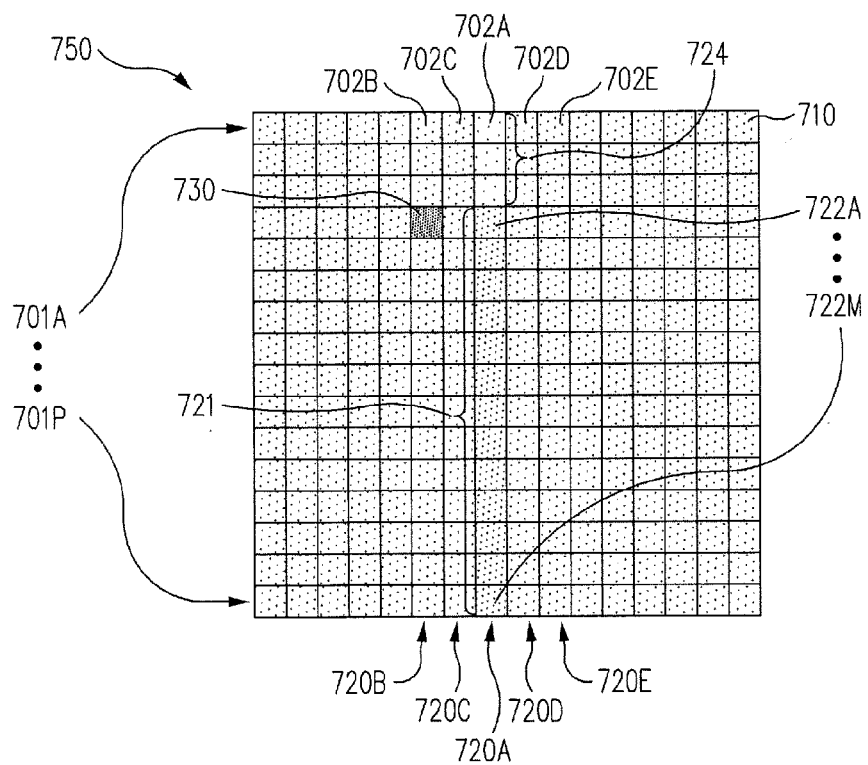
FIG. 7B shows a corrected version of the infrared image of FIG. 7A, in accordance with an embodiment of the invention.

By determining column correction terms based on less than, equal to, or greater than relationships (e.g., rather than the actual numerical differences between the digital counts of different pixels), the column correction terms may be less skewed by the presence of small vertical objects appearing in infrared images. In this regard, by using this approach, small objects such as object 621 with high numbers of digital counts may not inadvertently cause column correction terms to be calculated that would overcompensate for such objects (e.g., resulting in an undesirable infrared image 650 as shown in FIG. 6B). Rather, using this approach, object 621 may not cause any change to column correction terms (e.g., resulting in an unchanged infrared image 600 as shown in FIG. 6A). However, larger objects such as object 721 which may be legitimately identified as column noise may be appropriately reduced through adjustment of column correction terms (e.g., resulting in a corrected infrared image 750 as shown in FIG. 7B).

In addition, using this approach may reduce the effects of other types of scene information on column correction term values. In this regard, because counters A, B, and C identify relative relationships (e.g., less than, equal to, or greater than) between pixels rather than actual numerical differences, exponential scene changes (e.g., non-linear scene information gradients) may contribute less to column correction term determinations. For example, exponentially higher digital counts in certain pixels may be treated as simply being greater than or less than other pixels for comparison purposes and consequently will not unduly skew the column correction term.

In addition, by identifying relative relationships rather than actual numerical differences in counters A, B, and C, high pass filtering can be reduced in some embodiments. In this regard, where low frequency scene information or noise remains fairly uniform throughout compared neighborhoods of pixels, such low frequency content may not significantly affect the relative relationships between the compared pixels.

Advantageously, counters A, B, and C provide an efficient approach to calculating column correction terms. In this regard, in some embodiments, only three counters A, B, and C are used to store the results of all pixel comparisons performed for a selected column. This contrasts with various other approaches in which many more unique values are stored (e.g., where particular numerical differences, or the number of occurrences of such numerical differences, are stored).

In some embodiments, where the total number of rows of an infrared image is known, further efficiency may be achieved by omitting counter B. In this regard, the total number of counts may be known based on the range of columns used for comparison and the number of rows of the infrared image. In addition, it may be assumed that any comparisons that do not result in counter A or counter C being adjusted will correspond to those comparisons where pixels have equal values. Therefore, the value that would have been held by counter B may be determined from counters A and C (e.g., (number of rows×range)−counter A value−counter B value=counter C value).

These techniques may also be used to compensate for larger vertical anomalies in infrared images where appropriate. For example, FIG. 7A illustrates an infrared image 700 of scene 170 in accordance with an embodiment of the invention. Similar to infrared image 600, infrared image 700 depicts scene 170 as relatively uniform, with a majority of pixels 710 of infrared image 700 having the same or similar intensity. Also in this embodiment, a column 720A of infrared image 700 includes pixels 722A-M that are somewhat darker than pixels 710, while the remaining pixels 724 of column 720A have a substantially uniform intensity with pixels 710.

However, in contrast to pixels 622A-D of FIG. 6A, pixels 722A-M of FIG. 7A occupy a significant majority of column 720A. As such, it is more likely that an object 721 depicted by pixels 722A-M may actually be an anomaly such as column noise or another undesired source rather than an actual structure or other actual scene information. For example, in some embodiments, it is contemplated that actual scene information that occupies a significant majority of at least one column would also likely occupy a significant horizontal portion of one or more rows. For example, a vertical structure in close proximity to image capture component 130 may be expected to occupy multiple columns and/or rows of infrared image 700. Because object 721 appears as a tall narrow band occupying a significant majority of only one column 720A, it is more likely that object 721 is actually column noise.

FIG. 7B shows a corrected version 750 of infrared image 700 of FIG. 7A. As shown in FIG. 7B, column 720A has been brightened, but not as significantly as column 620A of infrared image 650. Pixels 722A-M have been made lighter, but still appear slightly darker than pixels 710. In another embodiment, column 720A may be corrected such that pixels 722A-M may be approximately uniform with pixels 710. As also shown in FIG. 7B, remaining pixels 724 of column 720A have been brightened but not as significantly as pixels 624 of infrared image 650. In another embodiment, pixels 724 may be further brightened or may remain substantially uniform with pixels 710.

Figure 8:
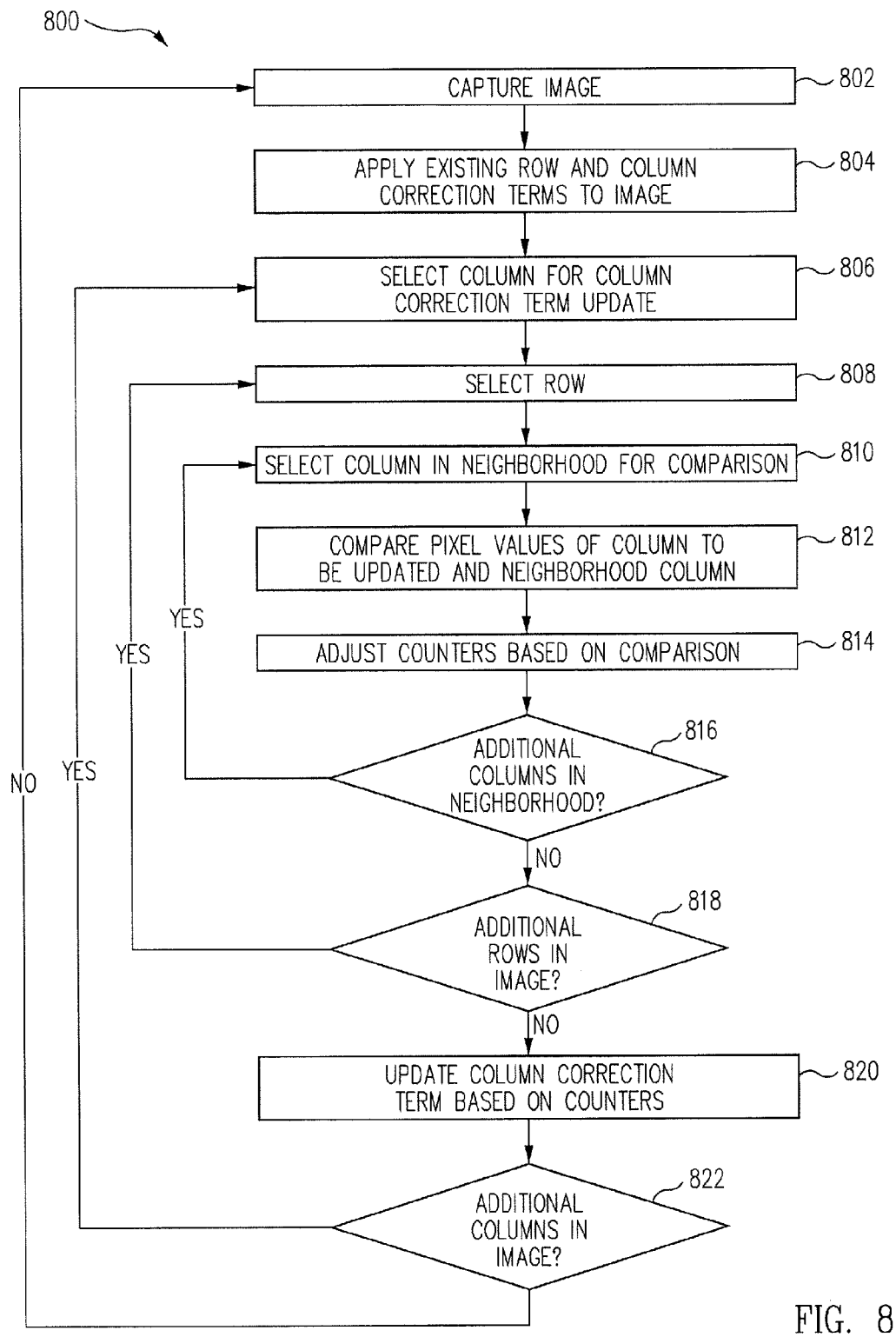
FIG. 8 is a flowchart illustrating another method for noise filtering an infrared image, in accordance with an embodiment of the invention.
Figure 9A:
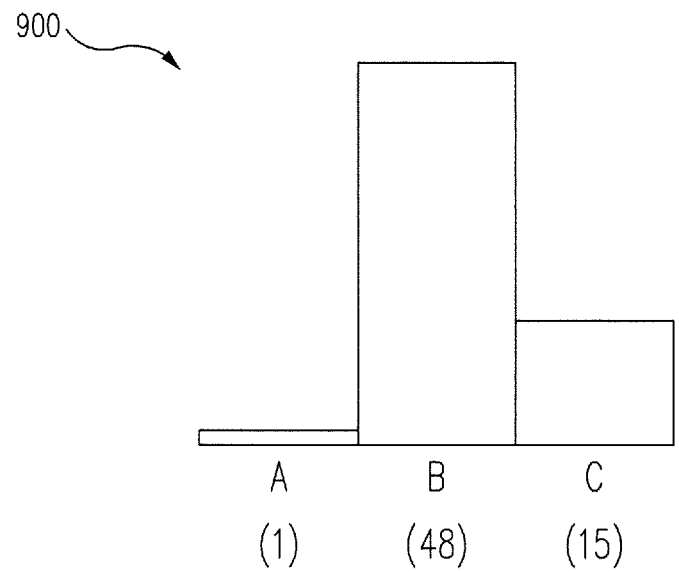
FIG. 9A shows a histogram prepared for the infrared image of FIG. 6A, in accordance with an embodiment of the invention.
Figure 9B:
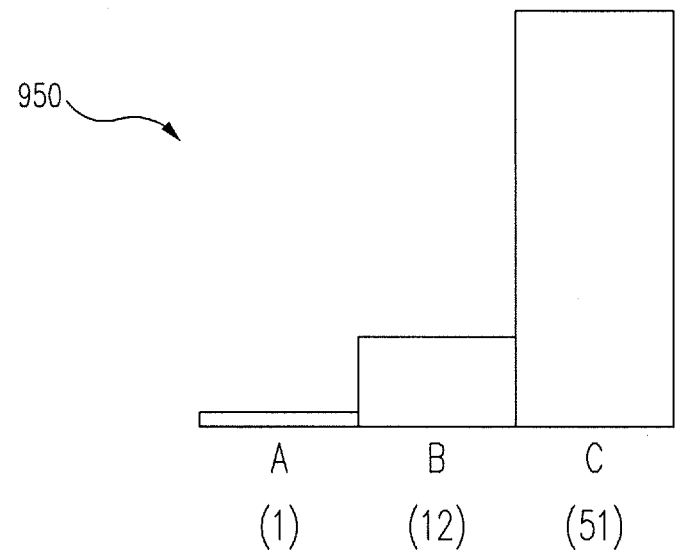
FIG. 9B shows a histogram prepared for the infrared image of FIG. 7A, in accordance with an embodiment of the invention.

Various aspects of these techniques are further explained with regard to FIGS. 8 and 9A-B. In this regard, FIG. 8 is a flowchart illustrating a method 800 for noise filtering an infrared image, in accordance with an embodiment of the invention. Although particular components of system 100 are referenced in relation to particular blocks of FIG. 8, the various operations described with regard to FIG. 8 may be performed by any appropriate components, such as image capture component 130, processing component, 110, noise filtering module 112, memory component 120, control component 140, and/or others.

In block 802, image capture component 130 captures an infrared image (e.g., infrared image 600 or 700) of scene 170. In block 804, noise filtering module 112 applies existing row and column correction terms to infrared image 600/700. In some embodiments, such existing row and column correction terms may be determined by any of the various techniques described herein, factory calibration operations, and/or other appropriate techniques. In some embodiments, the column correction terms applied in block 804 may be undetermined (e.g., zero) during a first iteration of block 804, and may be determined and updated during one or more iterations of FIG. 8.

In block 806, noise filtering module 112 selects a column of infrared image 600/700. Although column 620A/720A will be referenced in the following description, any desired column may be used. For example, in some embodiments, a rightmost or leftmost column of infrared image 600/700 may be selected in a first iteration of block 806. In some embodiments, block 806 may also include resetting counters A, B, and C to zero or another appropriate default value.

In block 808, noise filtering module 112 selects a row of infrared image 600/700. For example, a topmost row 601A/701A of infrared image 600/700 may be selected in a first iteration of block 808. Other rows may be selected in other embodiments.

In block 810, noise filtering module 112 selects another column in a neighborhood for comparison to column 620A. In this example, the neighborhood has a range of two columns (e.g., columns 620B-E/720B-E) on both sides of column 620A/720A, corresponding to pixels 602B-E/702B-E in row 601A/701A on either side of pixel 602A/702A. Accordingly, in one embodiment, column 620B may be selected in this iteration of block 810.

In block 812, noise filtering module 112 compares pixels 602B/702B to pixel 602A/702A. In block 814, counter A is adjusted if pixel 602A/702A has a lower value than pixel 602B/702B. Counter B is adjusted if pixel 602A/702A has an equal value as pixel 602B/702B. Counter C is adjusted if pixel 602A/702A has a higher value than pixel 602B/702B. In this example, pixel 602A/702A has an equal value as pixel 602B/702B. Accordingly, counter B will be adjusted, and counters A and C will not be adjusted in this iteration of block 814.

In block 816, if additional columns in the neighborhood remain to be compared (e.g., columns 620C-E/720C-E), then blocks 810-816 are repeated to compare the remaining pixels of the neighborhood (e.g., pixels 602B-E/702B-E residing in columns 620C-E/720C-E and in row 601A/701A) to pixel 602A/702A. In FIGS. 6A/7A, pixel 602A/702A has an equal value as all of pixels 602B-E/702B-E. Accordingly, after pixel 602A/702A has been compared with all pixels in its neighborhood, counter B will have been adjusted by four counts, and counters A and C will not have been adjusted.

In block 818, if additional rows remain in infrared images 600/700 (e.g., rows 601B-P/701B-P), then blocks 808-818 are repeated to compare the remaining pixels of column 620A/720A with the remaining pixels of columns 602B-E/702B-E on a row by row basis as discussed above.

Following block 818, each of the 16 pixels of column 620A/720A will have been compared to 4 pixels (e.g., pixels in columns 620B-E residing in the same row as each compared pixel of column 620A/720A) for a total of 64 comparisons. This results in 64 adjustments collectively shared by counters A, B, and C.

FIG. 9A shows the values of counters A, B, and C represented by a histogram 900 after all pixels of column 620A have been compared to the various neighborhoods of pixels included in columns 620B-E, in accordance with an embodiment of the invention. In this case, counters A, B, and C have values of 1, 48, and 15, respectively. Counter A was adjusted only once as a result of pixel 622A of column 620A having a lower value than pixel 630 of column 620B. Counter C was adjusted 15 times as a result of pixels 622A-D each having a higher value when compared to their neighborhood pixels of columns 620B-E (e.g., except for pixel 630 as noted above). Counter B was adjusted 48 times as a result of the remaining pixels 624 of column 620A having equal values as the remaining neighborhood pixels of columns 620B-E.

FIG. 9B shows the values of counters A, B, and C represented by a histogram 950 after all pixels of column 720A have been compared to the various neighborhoods of pixels included in columns 720B-E, in accordance with an embodiment of the invention. In this case, counters A, B, and C have values of 1, 12, and 51, respectively. Similar to FIG. 9A, counter A in FIG. 9B was adjusted only once as a result of a pixel 722A of column 720A having a lower value than pixel 730 of column 720B. Counter C was adjusted 51 times as a result of pixels 722A-M each having a higher value when compared to their neighborhood pixels of columns 720B-E (e.g., except for pixel 730 as noted above). Counter B was adjusted 12 times as a result of the remaining pixels of column 720A having equal values as the remaining neighborhood compared pixels of columns 720B-E.

Referring again to FIG. 8, in block 820, the column correction term for row 620A/720A is updated (e.g., selectively incremented, decremented, or remain the same) based on the values of counters A, B, and C. For example, as discussed above, in some embodiments, the column correction term may be incremented if counter A−counter B−counter C>D; the column correction term may be decremented if counter C−counter A−counter B>D; and the column correction term may remain the same in all other cases.

In the case of infrared image 600, applying the above calculations to the counter values identified in FIG. 9A results in no change to the column correction term (e.g., 1(counter A)−48(counter B)−15(counter C)=−62 which is not greater than D, where D equals (16 rows)/2; and 15(counter C)−1 (counter A)−48(counter B)=−34 which is not greater than D, where D equals (16 rows)/2). Thus, in this case, the values of counters A, B, and C, and the calculations performed thereon indicate that values of pixels 622A-D are associated with an actual object (e.g., object 621) of scene 170. Accordingly, the small vertical structure 621 represented by pixels 622A-D will not result in any overcompensation in the column correction term for column 620A.

In the case of infrared image 700, applying the above calculations to the counter values identified in FIG. 9B results in a decrement in the column correction term (e.g., 51(counter C)−1(counter A)−12(counter B)=38 which is greater than D, where D equals (16 rows)/2. Thus, in this case, the values of counters A, B, and C, and the calculations performed thereon indicate that the values of pixels 722A-M are associated with column noise. Accordingly, the large vertical object 721 represented by pixels 722A-M will result in a lightening of column 720A to improve the uniformity of corrected infrared image 750 shown in FIG. 7B.

At block 822, if additional columns remain to have their column correction terms updated, then the process returns to block 806 wherein blocks 806-822 are repeated to update the column correction term of another column. After all column correction terms have been updated, the process returns to block 802 where another infrared image is captured. In this manner, FIG. 8 may be repeated to update column correction terms for each newly captured infrared image.

In some embodiments, each newly captured infrared image may not differ substantially from recent preceding infrared images. This may be due to, for example, a substantially static scene 170, a slowing changing scene 170, temporal filtering of infrared images, and/or other reasons. In these cases, the accuracy of column correction terms determined by FIG. 8 may improve as they are selectively incremented, decremented, or remain unchanged in each iteration of FIG. 8. As a result, in some embodiments, many of the column correction terms may eventually reach a substantially steady state in which they remain relatively unchanged after a sufficient number of iterations of FIG. 8, and while the infrared images do not substantially change.

Other embodiments are also contemplated. For example, block 820 may be repeated multiple times to update one or more column correction terms using the same infrared image for each update. In this regard, after one or more column correction terms are updated in block 820, the process of FIG. 8 may return to block 804 to apply the updated column correction terms to the same infrared image used to determine the updated column correction terms. As a result, column correction terms may be iteratively updated using the same infrared image. Such an approach may be used, for example, in offline (non-realtime) processing and/or in realtime implementations with sufficient processing capabilities.

In addition, any of the various techniques described with regard to FIGS. 6A-9B may be combined where appropriate with the other techniques described herein. For example, some or all portions of the various techniques described herein may be combined as desired to perform noise filtering.

Although column correction terms have been primarily discussed with regard to FIGS. 6A-9B, the described techniques may be applied to row-based processing. For example, such techniques may be used to determine and update row correction terms without overcompensating for small horizontal structures appearing in scene 170, while also appropriately compensating for actual row noise. Such row-based processing may be performed in addition to, or instead of various column-based processing described herein. For example, additional implementations of counters A, B, and/or C may be provided for such row-based processing.

In some embodiments where infrared images are read out on a row-by-row basis, row-corrected infrared images may be may be rapidly provided as row correction terms are updated. Similarly, in some embodiments where infrared images are read out on a column-by-column basis, column-corrected infrared images may be may be rapidly provided as column correction terms are updated.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into sub-components having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described herein illustrate but do not limit the invention. It should also be understood that numerous modifications and variations are possible in accordance with the principles of the invention. Accordingly, the scope of the invention is defined only by the following claims.

What is claimed is:

1. A method of processing infrared image data, the method comprising:
    receiving infrared image data associated with a scene, wherein the infrared image data comprises a plurality of pixels arranged in a plurality of rows and columns, wherein at least a subset of the pixels comprise column noise;
    selecting one of the columns;
    for each pixel of the selected column, comparing the pixel to a corresponding plurality of neighborhood pixels residing in the same row as the pixel;
    for each comparison, adjusting a first counter if the pixel of the selected column has a value greater than the compared neighborhood pixel;
    for each comparison, adjusting a second counter if the pixel of the selected column has a value less than the compared neighborhood pixel;
    for each comparison, adjusting a third counter if the pixel of the selected column has a value equal to the compared neighborhood pixel;
    determining, based on at least the first, second, and third counters, that an update condition for a column correction term associated with the selected column is met; and
    selectively updating the column correction term in response to the determining that the update condition is met to reduce the column noise associated with the selected column.

2. The method of claim 1, wherein the updating comprises:
    performing one or more calculations using values of, at least, the first and second counters;
    adjusting the column correction term if the one or more calculations indicate that the values of the pixels of the selected column are associated with column noise; and
    refraining from adjusting the column correction term if the one or more calculations indicate that the values of the pixels of the selected column are associated with an object in the scene.

3. The method of claim 1, wherein the first and second counters are implemented by registers, memory locations, or accumulators.

4. The method of claim 1, wherein the neighborhood pixels corresponding to each pixel of the selected column reside in a neighborhood defined by an intersection of: the same row as the pixel of the selected column; and a predetermined range of columns.

5. The method of claim 4, wherein the neighborhood has a range of at least two columns, wherein the infrared image data comprises 512 rows and 640 columns.

6. The method of claim 1, further comprising performing the selecting, comparing, adjusting, and updating for all remaining columns of the infrared image data.

7. The method of claim 1, wherein the infrared image data is first infrared image data, the method further comprising:
    receiving second infrared image data;
    applying the updated column correction term to the second infrared image data to provide second corrected infrared image data; and
    performing the selecting, comparing, adjusting, and updating using the second corrected infrared image data to further update the column correction term.

8. The method of claim 1, further comprising:
    applying the updated column correction term to the infrared image data to provide corrected infrared image data; and
    repeating the comparing, adjusting, and updating for the selected column using the corrected infrared image data.

9. The method of claim 1, wherein the first and second counters are first and second column-based processing counters, wherein the neighborhood pixels are first neighborhood pixels, the method further comprising:
    selecting one of the rows;
    for each pixel of the selected row, comparing the pixel to a corresponding plurality of second neighborhood pixels;
    for each comparison, adjusting a first row-based processing counter if the pixel of the selected row has a value greater than the compared second neighborhood pixel;
    for each comparison, adjusting a second row-based processing counter if the pixel of the selected row has a value less than the compared second neighborhood pixel; and
    selectively updating a row correction term associated with the selected row based on the first and second row-based processing counters.

10. A system comprising:
    a memory component adapted to receive infrared image data associated with a scene, wherein the infrared image data comprises a plurality of pixels arranged in a plurality of rows and columns, wherein at least a subset of the pixels comprise column noise; and
    a processor adapted to execute instructions to:
        select one of the columns,
        for each pixel of the selected column, compare the pixel to a corresponding plurality of neighborhood pixels residing in the same row as the pixel,
        for each comparison, adjust a first counter if the pixel of the selected column has a value greater than the compared neighborhood pixel,
        for each comparison, adjust a second counter if the pixel of the selected column has a value less than the compared neighborhood pixel,
        for each comparison, adjust a third counter if the pixel of the selected column has a value equal to the compared neighborhood pixel;
        determine, based on at least the first, second, and third counters, that an update condition for a column correction term associated with the selected column is met; and selectively update the column correction term in response to the determining that the update condition is met to reduce the column noise associated with the selected column.

11. The system of claim 10, wherein the instructions to update the column correction term are adapted to cause the processor to:
perform one or more calculations using values of, at least, the first and second counters;
adjust the column correction term if the one or more calculations indicate that the values of the pixels of the selected column are associated with column noise; and
refrain from adjusting the column correction term if the one or more calculations indicate that the values of the pixels of the selected column are associated with an object in the scene.

12. The system of claim 10, wherein the first and second counters are implemented by registers, memory locations, or accumulators.

13. The system of claim 10, wherein the neighborhood pixels corresponding to each pixel of the selected column reside in a neighborhood defined by an intersection of: the same row as the pixel of the selected column; and a predetermined range of columns.

14. The system of claim 13, wherein the neighborhood has a range of at least two columns, wherein the infrared image data comprises 512 rows and 640 columns.

15. The system of claim 10, wherein the processor is adapted to execute instructions to perform the select, compare, adjust, and update operations for all remaining columns of the infrared image data.

16. The system of claim 10, wherein:
the infrared image data is first infrared image data;
the memory component is adapted to receive second infrared image data; and
the processor is adapted to execute instructions to:
apply the updated column correction term to the second infrared image data to provide second corrected infrared image data, and
perform the select, compare, adjust, and update operations using the second corrected infrared image data to further update the column correction term.

17. The system of claim 10, wherein the processor is adapted to execute instructions to:
apply the updated column correction term to the infrared image data to provide corrected infrared image data; and
repeat the compare, adjust, and update operations for the selected column using the corrected infrared image data.

18. The system of claim 10, wherein the first and second counters are first and second column-based processing counters, wherein the neighborhood pixels are first neighborhood pixels, wherein the processor is adapted to execute instructions to:
select one of the rows;
for each pixel of the selected row, compare the pixel to a corresponding plurality of second neighborhood pixels;
for each comparison, adjust a first row-based processing counter if the pixel of the selected row has a value greater than the compared second neighborhood pixel;
for each comparison, adjust a second row-based processing counter if the pixel of the selected row has a value less than the compared second neighborhood pixel; and
selectively update a row correction term associated with the selected row based on the first and second row-based processing counters.

\* \* \* \* \*